United States Patent [19]
Wada et al.

[11] Patent Number: 5,134,005
[45] Date of Patent: Jul. 28, 1992

[54] FRICTION ELEMENT FOR OPERATING IN FLUID

[75] Inventors: Susumu Wada, Gumma; Yoshihiro Fujita, Saitama, both of Japan

[73] Assignees: Akebono Brake Industry Co., Ltd., Tokyo; Akebono Research and Development Centre Ltd., Hanyu, both of Japan

[21] Appl. No.: 547,075

[22] Filed: Jul. 3, 1990

[30] Foreign Application Priority Data

Jul. 6, 1989 [JP] Japan .................................. 1-175062

[51] Int. Cl.$^5$ ...................... F16D 69/00; F16D 13/64
[52] U.S. Cl. ........................................ 428/65; 428/66; 192/70.12; 192/70.14; 192/107 R; 188/218 XL
[58] Field of Search ............... 428/65, 66; 192/107 R, 192/70.12, 70.14; 188/218 XL

[56] References Cited

U.S. PATENT DOCUMENTS

| 2,020,748 | 11/1935 | Waseige | 192/70.12 |
| 4,726,455 | 2/1988 | East | 192/107 R |
| 4,913,267 | 4/1990 | Campbell et al. | 192/70.12 |

FOREIGN PATENT DOCUMENTS

| 0128758 | 12/1984 | European Pat. Off. |
| 739244 | 10/1955 | United Kingdom |

Primary Examiner—Alexander S. Thomas
Attorney, Agent, or Firm—Cushman, Darby & Cushman

[57] ABSTRACT

A ring-shaped friction element for operating in oil provided with a plurality of oil containers at an inner peripheral portion thereof and a plurality of grooves communicating between the oil containers and an outer periphery of the friction element.

11 Claims, 2 Drawing Sheets

FRICTION ELEMENT FOR OPERATING IN FLUID

FIELD OF THE INVENTION

The present invention relates to a friction element for operating in fluid such as oil for friction engaging mechanisms employed in industrial machines or motor vehicles. More particularly, the invention relates to a friction element sufficiently suppressing so-called a dragging phenomenon without deteriorating durability.

DESCRIPTION OF THE RELATED ART

In the industrial machines or motor vehicle fields, it is known to employ a friction engaging mechanism in which a plurality of friction elements and a plurality of frictional mating elements are alternately stacked and operate in oil, as disclosed in U.S. Pat. No. 3,927,241. These elements are mostly used for multiple clutches or multiple brakes. Such a mechanism has been improved in durability of the friction elements due to cooling properties of evaporation heat and lubricantivity of oil. For this reason, these friction elements operating in oil are often used for automatic transmission clutch plates or the like.

However, since the friction elements operate in oil, the operation of the elements is influenced by viscosity of the oil. That is, even if no pressure is applied to the friction element, friction surface of the friction element is substantially engaged with the surface of the frictional mating element through the oil thereby occurring the dragging phenomenon. The dragging phenomenon would suffer from several problems that, for example, temperature of oil will increases or cooling properties of oil for the friction surfaces would be insufficient. These conditions are disadvantageous in that the durability of the friction element is deteriorated and, further, fuel consumption rate of the driving vehicle would increase.

Several techniques and arrangements have been developed for preventing the foregoing drawbacks accompanying the conventional friction elements. For example, grooves are provided on a surface of the friction elements, or a driving plate of the elements is waved as disclosed in Unexamined Japanese Pat. application (OPI) Nos. Sho. 62-80316, Sho. 62-82428 or U.S. Pat. No. 4,045,608. Each techniques arranged the structure of grooves so as to obtain good balance of the dragging phenomenon with wear amount of the friction surface. The arrangement of the grooves includes radial, parallel or double parallel grooves. However, the grooves actually decrease the frictional area of the friction elements and, accordingly, the wear amount of the friction elements will increases if total area of the grooves increases. Thus, the conventional arts having grooves still have problems.

SUMMARY OF THE INVENTION

In view of the foregoing problems accompanying the conventional arts, an object of the present invention is to provide an improved friction element for operating in fluid such as oil, capable of maintaining good durability and the largest frictional area of the friction element while suppressing the dragging phenomenon.

According to the present invention, a ring-shaped friction element for operating in fluid such as oil is provided with a plurality of oil containers at an inner peripheral portion thereof and a plurality of grooves communicating between the oil containers and an outer periphery of the friction element.

According to another aspect of the invention, a ring-shaped friction element having grooves for operating in oil is provided with a plurality of oil containers at an inner peripheral portion thereof and a plurality of other grooves communicating between the oil containers and an outer periphery of the friction element.

DESCRIPTION OF THE PREFERRED EMBODIMENT

Figure 1:
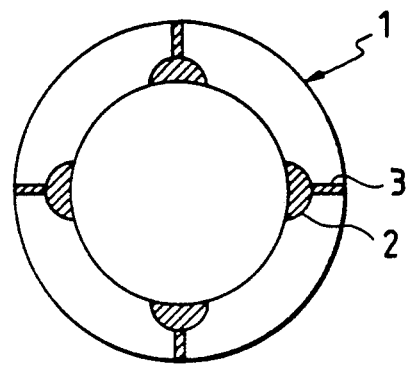
FIG. 1 shows a friction element according to the first embodiment of the invention.

FIG. 1 is a plan view showing a friction element for operating in fluid such as oil according to the first embodiment of the present invention.

A ring-shaped friction element 1 is provided with four semicircular fluid containers 2 at an inner peripheral portion thereof and four grooves 3 communicating between the respective fluid containers, and the outer periphery of the friction element. An area of each of the fluid containers 2 is defined within a range between 0.5% to 3% of total frictional surface area of the friction element. Further, sum of surface area of the fluid containers 2 and the grooves 3 is preferably defined within a range between 5% to 10% of the total frictional surface area of the friction element.

When the friction elements are rotating under operation, oil at the inner side of the ring-shaped friction elements is flown to the outer periphery of the friction elements by the centrifugal force through the fluid containers and the respective grooves. A diameter of the fluid container facing inside of the friction element is larger than that of the groove. The fluid container 2 having such a shape increases pressure of oil in the groove 3 toward outer periphery of the friction element, so that the dragging phenomenon is effectively suppressed.

Although FIG. 1 shows four fluid containers, the number of the containers is not limited thereto or thereby. That is, the number of fluid containers may be varied in accordance with demand of property. Even number, more preferably equal to or more than four containers may be provided.

Further, although the shape of the containers shown in FIG. 1 is semicircular, the shape is not limited thereto or thereby. It is important that surface area of each of the containers is preferably defined within a range between 0.5% to 3% of the total frictional surface area of the friction element.

The friction element may unitary be formed or formed from a plurality of pieces. In the latter case, a gap between pieces forms the fluid container and groove. For example, the friction element shown in FIG. 1 is formed from four pieces.

The purpose of the fluid containers and respective grooves is to improve the cooling properties on the friction element as well as to suppress the dragging phenomenon. However, when the cooling properties of the fluid containers and the grooves is not sufficient yet, other grooves communicating no fluid container may be provided as illustrated in FIGS. 2 and 3.

Figure 2:
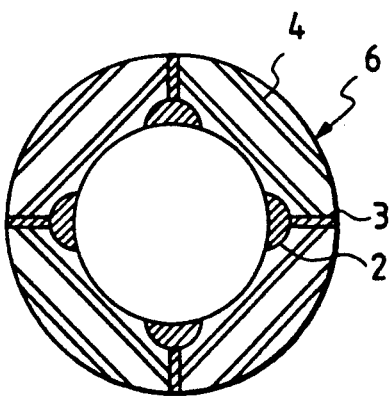
FIGS. 2 and 3 show friction elements according to the second and third embodiments, respectively, of the invention.
Figure 3:
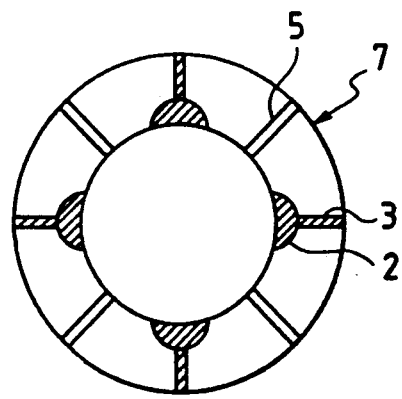

FIGS. 2 and 3 show friction element according to second and third embodiments, respectively, of the present invention.

According to the second embodiment shown in FIG. 2, the friction element 6 for operating in fluid such as oil is provided not only with fluid container 2 and groove 3 but also with other grooves 4. Further, in FIG. 3 the friction element 7 is provided not only with fluid container 2 and groove 3 but also with other grooves 5. These arrangements of the friction element further improve the cooling properties of the friction element.

Experimentation

An experimentation was made with respect to the dragging torque and wear amount between a friction element having fluid containers according to the present invention shown in FIG. 1 and the conventional friction element having no such container but radial grooves, changing a ratio of frictional area. The ratio of frictional area means a ratio of sum of the surface area of fluid containers and respective grooves to total frictional area of the ring-shaped friction element.

Figure 4:
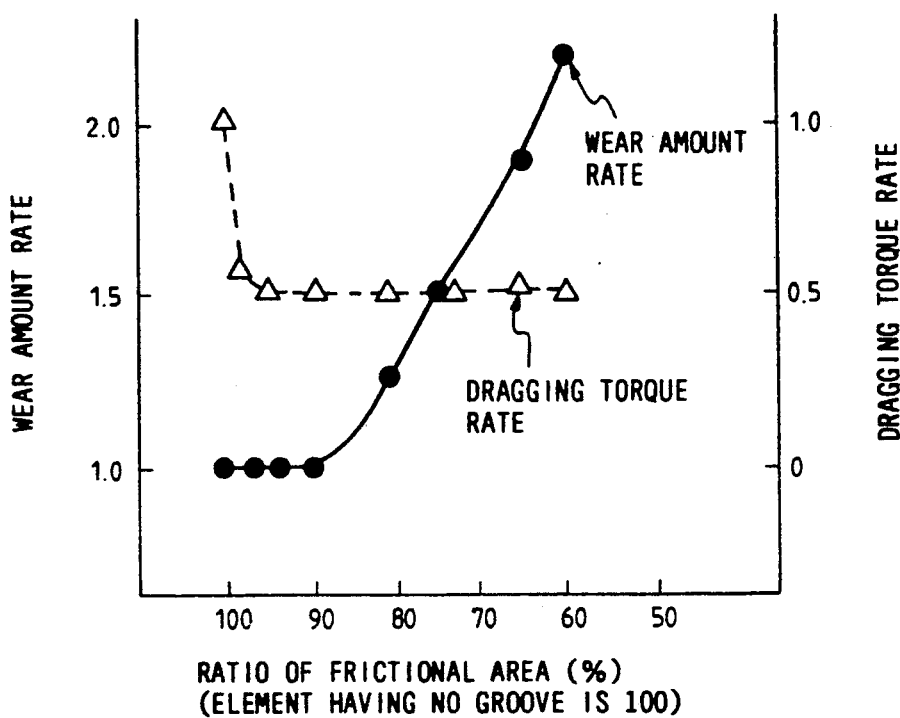
FIG. 4 is a graph showing a result of experimentation with respect to the present invention.
Figure 5:
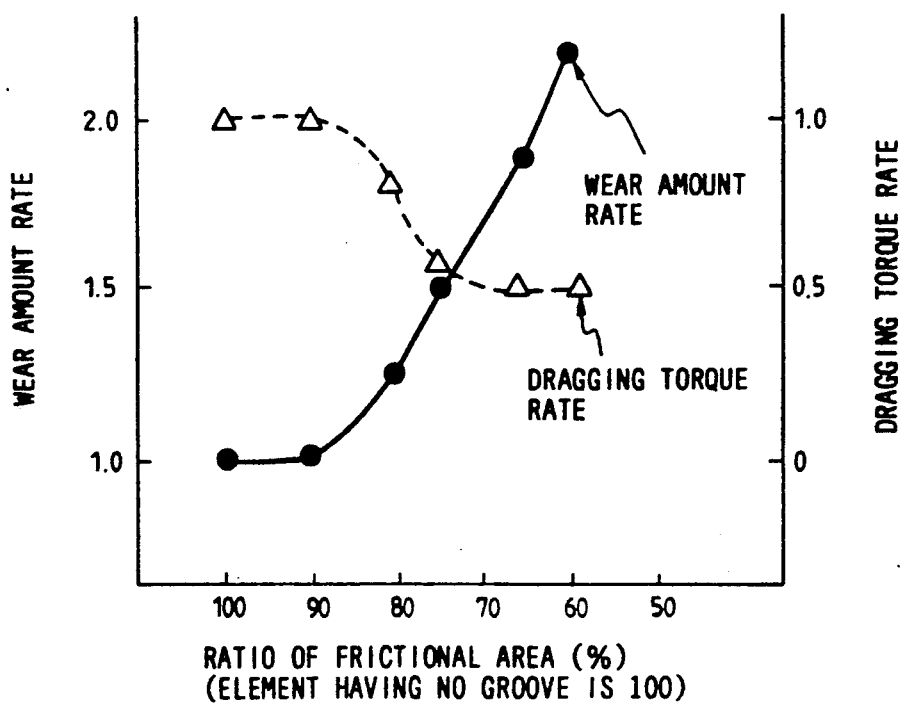
FIG. 5 is a graph showing a result of experimentation with respect to the conventional friction element.

FIG. 4 shows a result of the experimentation as to the friction element according to the present invention, and FIG. 5 shows the result as to the conventional friction element having radially-shaped grooves but no fluid containers.

| Condition of the Experimentation | |
| --- | --- |
| Tester | conform with SAE No. 2 |
| Size | $\phi 133 \times \phi 113$ |
| Revolution | 3,000 rpm |
| Inertial force | 0.035 kgfms$^2$ |
| Surface pressure | 20 kgf/cm$^2$ |
| Oil Temperature | 120° C. |
| Repeat number of engagement | 5,000 times |

As is apparent from FIG. 4, when the ratio of frictional area is within a range between 95% to 90%, that is, when sum of surface areas of the fluid containers and the respective grooves is within a range between 5% to 10% of the total frictional surface area of the friction element, the wear amount is substantially the same as that of the frictional element having neither container nor groove with largely suppressing the dragging. In contrast, as is apparent from FIG. 5 showing result of the experimentation for the conventional friction element, when the sum of the surface areas of the grooves is under 10% of the total surface area of the element, the dragging phenomenon is not suppressed even though the wear amount is substantially the same as that of the friction element having no container or groove.

As described above, the friction element for operating in fluid such as oil is clearly effective in suppressing the dragging torque even if the area of the grooves is small for decreasing the wear amount of the friction element.

What is claimed is:

1. A ring-shaped friction element for operating in fluid, comprising:
   a ring having a plurality of fluid reservoirs provided at an inner peripheral portion thereof, and a plurality of grooves, each of said grooves providing communication between only one of said fluid reservoirs and an outer periphery of said ring,
   wherein a surface area of each of said fluid reservoirs is within a range between 0.5% to 3% of total frictional surface area of said ring, and the sum of surface area of both said plurality of fluid reservoirs and said grooves is within a range between 5% to 10% of the total frictional surface area of said ring.

2. A ring-shaped friction element for operating in fluid, comprising:
   a ring having a plurality of first grooves for increasing cooling ability of the friction element, a plurality of fluid reservoirs provided at an inner peripheral portion of said ring, and a plurality of second grooves, each of said second grooves providing communication between only one of said fluid reservoirs and an outer periphery of the ring,
   wherein a surface area of each of said fluid reservoirs is within a range between 0.5% to 3% of total frictional surface area of the ring, and a sum of surface area of said plurality of fluid reservoirs, said first grooves and said second grooves is within a range between 5% to 10% of the total frictional surface area of the ring.

3. A ring-shaped friction element for operating in fluid, comprising:
   a ring having a plurality of fluid reservoirs provided at an inner peripheral portion of the ring and means for communicating said fluid reservoirs with an outer periphery of said ring, said communicating means comprising a plurality of individual communicating means, each of said individual communicating means providing communication between only one of said fluid reservoirs and said outer periphery of said ring,
   wherein a surface area of each of said fluid reservoirs is within a range between 0.5% to 3% of total frictional surface area of the ring and the sum of the surface areas of said each fluid reservoir and said communicating means is within a range between 5% to 10% of the total frictional surface area of the ring.

4. A ring-shaped friction element according to claim 3, wherein said ring has an even number of said fluid reservoirs.

5. A ring-shaped friction element according to claim 4, wherein said ring has at least four of said fluid reservoirs.

6. A ring-shaped friction element according to claim 3, wherein a first diameter of each of said fluid reservoirs facing said inner peripheral portion of said friction element is larger than a second diameter of each of said individual communicating means of said communicating means.

7. A ring-shaped friction element according to claim 6, wherein each of said fluid reservoirs is semicircular shaped.

8. A ring-shaped friction element according to claim 3, wherein said ring further comprises a plurality of grooves, each of said grooves providing communication between said inner periphery of said ring and said outer periphery of said ring.

9. A ring-shaped friction element according to claim 3, wherein said fluid is oil.

10. A ring-shaped friction element according to claim 3, wherein the ring is unitarily formed.

11. A ring-shaped friction element according to claim 3, wherein the ring comprises a plurality of pieces.

* * * * *